US009243745B1

(12) United States Patent
Hughes

(10) Patent No.: US 9,243,745 B1
(45) Date of Patent: Jan. 26, 2016

(54) MAGNETIC SLAT DEVICE AND KIT CONTAINING THE SAME

(71) Applicant: John Wesley Hughes, London, OH (US)

(72) Inventor: John Wesley Hughes, London, OH (US)

( * ) Notice: Subject to any disclaimer, the term of this patent is extended or adjusted under 35 U.S.C. 154(b) by 265 days.

(21) Appl. No.: 14/067,202

(22) Filed: Oct. 30, 2013

Related U.S. Application Data

(60) Provisional application No. 61/720,250, filed on Oct. 30, 2012.

(51) Int. Cl.
*A47F 7/00* (2006.01)
*F16M 13/02* (2006.01)

(52) U.S. Cl.
CPC .................................... *F16M 13/02* (2013.01)

(58) Field of Classification Search
CPC ..................................................... F16M 13/02
USPC ......... 248/37.3, 37.6, 206.5, 309.4; 211/70.1, 211/70.6, 70.7, DIG. 1
See application file for complete search history.

(56) References Cited

U.S. PATENT DOCUMENTS 3,929,519 A 12/1975 Benz
5,097,966 A * 3/1992 Miller ..................... B25H 3/04 211/65
5,669,516 A * 9/1997 Horn ........................ B25H 3/06 206/350
5,682,653 A 11/1997 Berglof et al.
6,719,155 B1 * 4/2004 Chang ...................... B25H 3/04 206/350
6,923,317 B2 * 8/2005 Coleman, Jr. .......... B25H 3/003 206/350
7,971,736 B1 * 7/2011 Stewart .................. A47G 21/14 211/70.7
2006/0006969 A1 1/2006 Cassar
2009/0104394 A1 4/2009 Wu et al.
2010/0275419 A1 11/2010 Millus
2010/0319166 A1 12/2010 Roche

* cited by examiner

*Primary Examiner* — Gwendolyn Baxter

(74) *Attorney, Agent, or Firm* — The Law Office of Patrick F. O'Reilly, III, LLC

(57) ABSTRACT

A magnetic slat device is disclosed herein. The magnetic slat device includes an elongate slat body, the elongate slat body having a generally curved cross-section with a first generally concave surface and a second generally convex surface, the elongate slat body further including a first longitudinal edge portion and a second longitudinal edge portion disposed opposite to the first longitudinal edge portion; and a plurality of magnets coupled to the elongate slat body, each of the plurality of magnets being spaced apart from one another along a length of the elongate slat body, and each of the plurality of magnets being disposed between the first and second longitudinal edge portions of the elongate slat body. Each of the plurality of magnets is configured to exert a magnetic force on a magnetic object. A slat kit comprising a plurality of magnetic slat devices is also disclosed herein.

20 Claims, 18 Drawing Sheets

Detail "A"

Section A-A

Detail "B"

Section B-B

Detail "C"

MAGNETIC SLAT DEVICE AND KIT CONTAINING THE SAME

CROSS-REFERENCE TO RELATED APPLICATIONS

This patent application claims priority to, and incorporates by reference in its entirety, U.S. Provisional Patent Application No. 61/720,250, entitled "APP SLATTS AND MAGNESLATTS", filed on Oct. 30, 2012.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to slat devices. More particularly, the invention relates to a magnetic slat device and a kit containing the same.

2. Background

Many tools, and other objects, including conventional slats of multiple varieties, are designed for one or two specific functions. As such, a person may have to spend a great deal of money to buy the items needed to complete a wide variety of tasks. Others may spend a great deal of time personally manufacturing items that perform these various actions. Even those that find themselves able to afford a wide range of tools and objects to complete a wide array of tasks may find themselves lacking the space required to store such tools and objects. Some others may require a specialized device for emergency or time-sensitive situations, yet the price of such specialized items may be cost-prohibitive.

Therefore, what is needed is a slat device that that provides a streamlined solution, and is capable of being flexibly used in various applications. Moreover, a slat device is needed that can be combined with other similar slat devices so that a myriad of different structures can be constructed therewith. Furthermore, there is a need for a slat device, which is provided as a component of a slat kit, that can be easily assembled with the other components of the kit to form various structures that are particularly suited to a user's specific needs.

BRIEF SUMMARY OF EMBODIMENTS OF THE INVENTION

Accordingly, the present invention is directed to a magnetic slat device and a kit containing the same that substantially obviates one or more problems resulting from the limitations and deficiencies of the related art.

In accordance with one or more embodiments of the present invention, there is provided a magnetic slat device, which includes: an elongate slat body, the elongate slat body having a generally curved cross-section with a first generally concave surface and a second generally convex surface, the elongate slat body further including a first longitudinal edge portion and a second longitudinal edge portion disposed opposite to the first longitudinal edge portion; and a plurality of magnets coupled to the elongate slat body, each of the plurality of magnets being spaced apart from one another along a length of the elongate slat body, and each of the plurality of magnets being disposed between the first and second longitudinal edge portions of the elongate slat body. In these one or more embodiments, each of the plurality of magnets is configured to exert a magnetic force on a magnetic object.

In a further embodiment of the present invention, at least one of the plurality of magnets is coupled to the elongate slat body by means of a magnet mounting member, the magnet mounting member including a recess for receiving the magnet.

In yet a further embodiment, the magnet mounting member further includes a central body portion and a peripheral flange portion, the central body portion of the magnet mounting member comprising the recess for receiving the magnet.

In still a further embodiment, the peripheral flange portion of the magnet mounting member comprises one or more apertures for accommodating a fastener passing therethrough.

In yet a further embodiment, the magnetic slat device further comprises a respective fastener passing through each of the one or more apertures in the peripheral flange portion of the magnet mounting member, each fastener securing the magnet to the elongate slat body.

In still a further embodiment, each of the first and second longitudinal edge portions of the elongate slat body comprise bent edge portions that extend outwardly from the elongate slat body in generally opposite directions.

In yet a further embodiment, each of the bent edge portions comprises an edge cover formed from a resilient material.

In still a further embodiment, each of the plurality of magnets comprises a first surface and a second surface disposed opposite to the first surface, the second surface of each of the plurality of magnets being disposed contiguous to the first generally concave surface of the elongate slat body.

In yet a further embodiment, each of the bent edge portions comprises a first surface that is connected to the first generally concave surface of the elongate slat body and a second surface that is connected to the second generally convex surface of the elongate slat body, the first surface of each of the bent edge portions being disposed opposite to the second surface of each of the bent edge portions, and wherein the first surface of each of the plurality of magnets is spaced apart from the first surface of at least one of the bent edge portions by a predetermined distance such that none of the plurality of magnets protrude beyond the first surfaces of the bent edge portions when the elongate slat body is in an undeformed state.

In still a further embodiment, the elongate slat body is formed from a resilient and bendable material.

In yet a further embodiment, at least one of the plurality of magnets comprises a neodymium magnet.

In still a further embodiment, the elongate slat body further comprises a plurality of apertures passing therethrough, each of the plurality of apertures being spaced apart from one another along a length of the elongate slat body.

In yet a further embodiment, the plurality of apertures comprises a plurality of pairs of the apertures, a first aperture of each of the pairs of the apertures being disposed on a first side of a respective one of the plurality of magnets, and a second aperture of each of the pairs of the apertures being disposed on a second side of a respective one of the plurality of magnets.

In still a further embodiment, the elongate slat body further comprises a generally flat region in a central portion of the generally curved cross-section.

In accordance with one or more other embodiments of the present invention, there is provided a magnetic slat device, which includes: an elongate slat body, the elongate slat body having a generally curved cross-section with a first generally concave surface and a second generally convex surface, the elongate slat body further including a first longitudinal edge portion, a second longitudinal edge portion disposed opposite to the first longitudinal edge portion, and a plurality of apertures being spaced apart from one another along a length of the elongate slat body; and a plurality of magnets coupled to the elongate slat body, each of the plurality of magnets being spaced apart from one another along a length of the elongate slat body, and each of the plurality of magnets being disposed between the first and second longitudinal edge portions of the elongate slat body. In these one or more other embodiments, each of the plurality of magnets is configured to exert a magnetic force on a magnetic object.

In accordance with yet one or more other embodiments of the present invention, there is provided a magnetic slat kit that comprises a plurality of magnetic slat devices. Each of the plurality of magnetic slat devices in the kit includes an elongate slat body, the elongate slat body having a generally curved cross-section with a first generally concave surface and a second generally convex surface, the elongate slat body further including a first longitudinal edge portion and a second longitudinal edge portion disposed opposite to the first longitudinal edge portion; and a plurality of magnets coupled to the elongate slat body, each of the plurality of magnets being spaced apart from one another along a length of the elongate slat body, and each of the plurality of magnets being disposed between the first and second longitudinal edge portions of the elongate slat body. In these one or more other embodiments, each of the plurality of magnetic slat devices is configured to be coupled to one another or to an external object by means of magnetic forces produced by the plurality of the magnets.

In a further embodiment of the present invention, a first device of the plurality of magnetic slat devices is configured to be coupled to a second device of the plurality of magnetic slat devices such that the first generally concave surface of the first device faces, in an opposing manner, the first generally concave surface of the second device and the plurality of magnets are encapsulated between the slat bodies of the first and second devices.

In yet a further embodiment, when the first and second devices are coupled to one another, the slat bodies of the first and second devices are each configured to resiliently deform such that at least a portion of a surface of each of the plurality of magnets of the first device lies contiguous to at least a portion of a surface of a respective one of the plurality of magnets of the second device.

In still a further embodiment, a first device of the plurality of magnetic slat devices is configured to be coupled to a second device of the plurality of magnetic slat devices such that the first generally concave surface of the first device faces, in an opposing manner, the second generally convex surface of the second device and the generally curved cross-sections of the first and second devices are disposed generally parallel to another.

In yet a further embodiment, the magnetic slat kit further comprises an elongate strengthening member having a first surface and a second surface disposed opposite to the first surface, the elongate strengthening member being formed from a generally rigid material; and wherein a first device of the plurality of magnetic slat devices is configured to be coupled to a second device of the plurality of magnetic slat devices and the elongate strengthening member such that the first generally concave surface of the first device faces, in an opposing manner, the first surface of the elongate strengthening member and the first generally concave surface of the second device faces, in an opposing manner, the second surface of the elongate strengthening member, and wherein the elongate strengthening member is sandwiched between the first and second devices.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figures 1A, 1B:
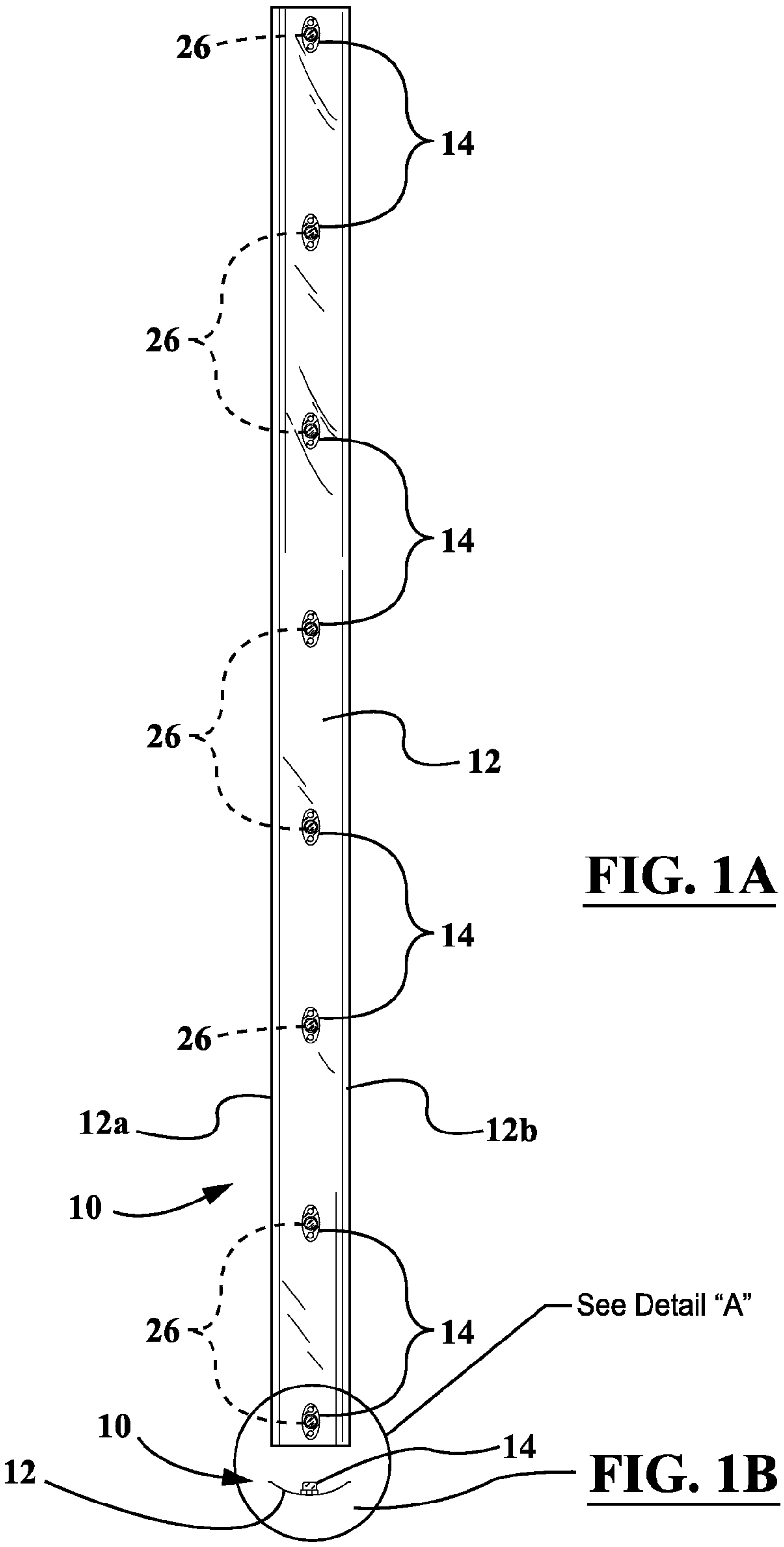
FIG. 1A is a plan view of a magnetic slat device, according to one embodiment of the invention, wherein the generally concave surface of the magnetic slat device is illustrated.
FIG. 1B is an end view of the magnetic slat device of FIG. 1A.
Figures 2A, 2B:
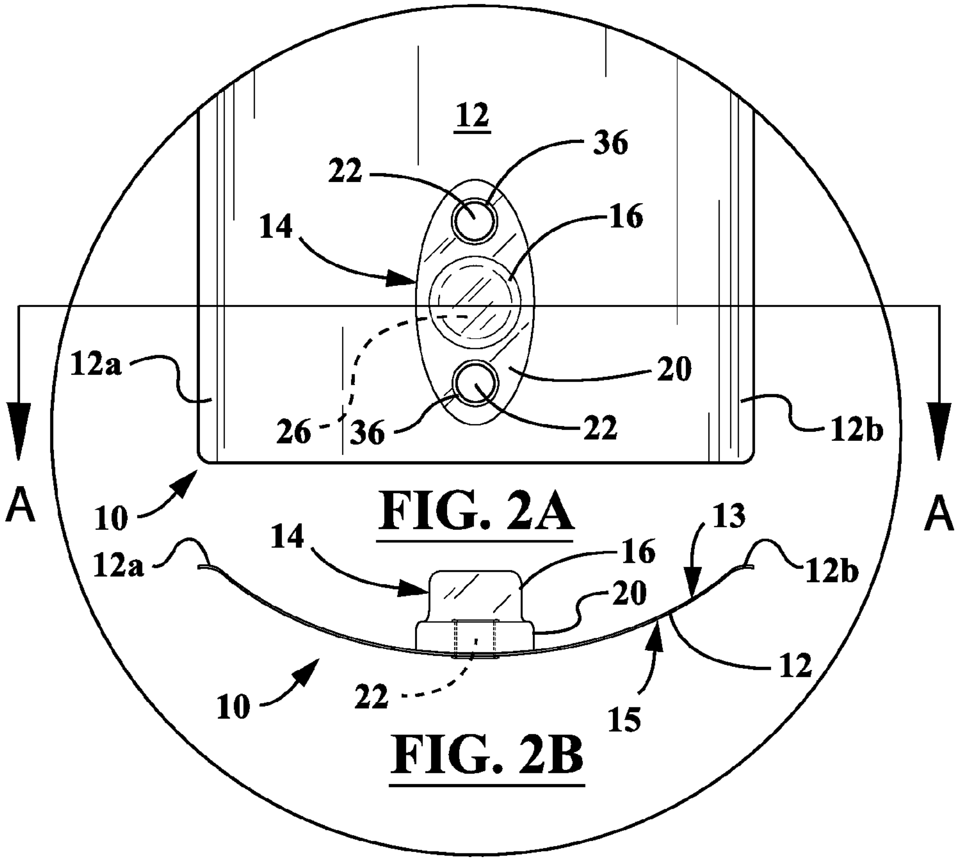
FIG. 2A is a partial enlarged plan view of an end of the magnetic slat device of FIGS. 1A and 1B (Detail “A”)
FIG. 2B is an enlarged end view of the magnetic slat device of FIGS. 1A and 1B (Detail “A”)
Figure 3:
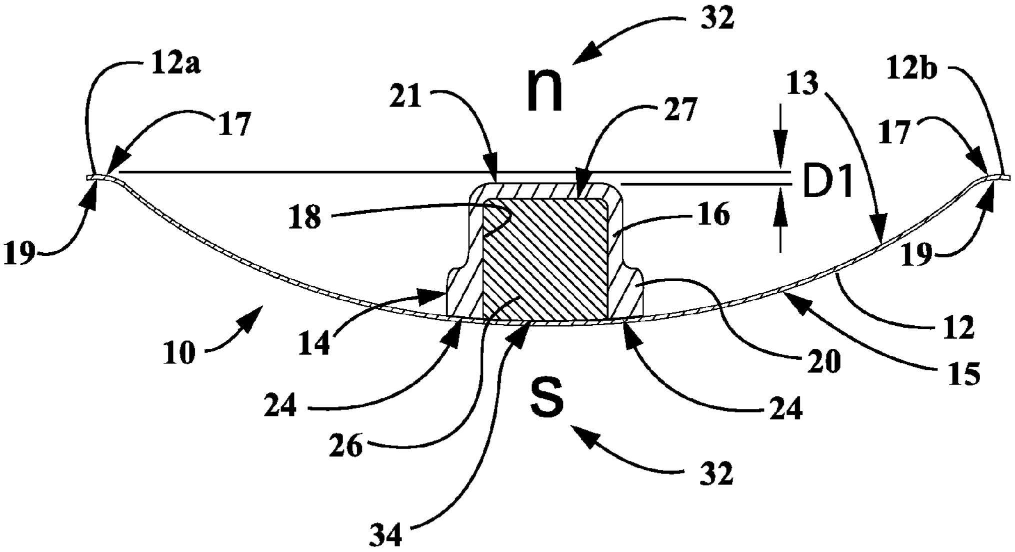
FIG. 3 is an enlarged sectional view of the magnetic slat device of FIGS. 1A and 1B, which is generally cut along the cutting-plane line A-A in FIG. 2A.
Figures 4A, 4B:
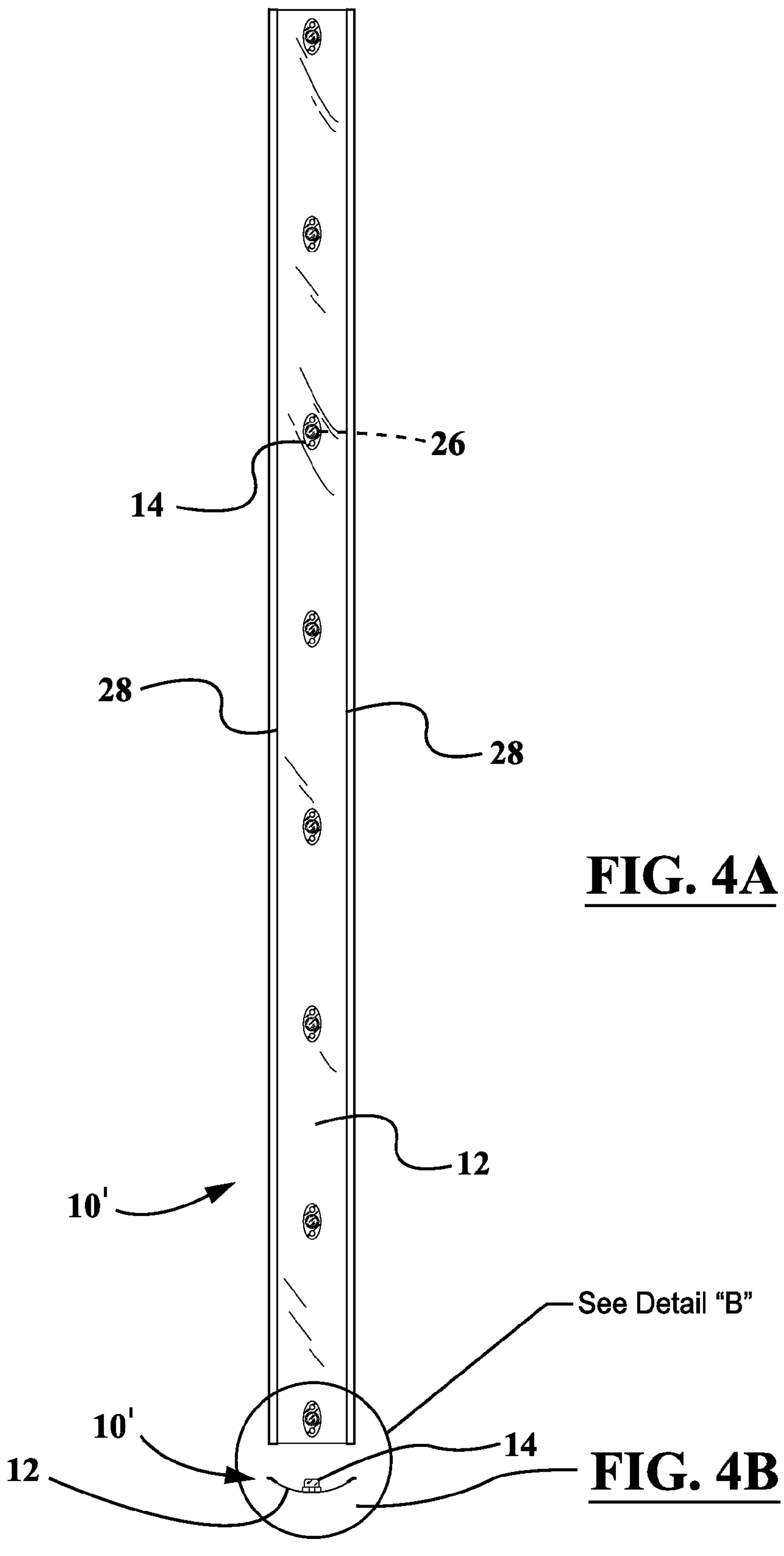
FIG. 4A is a plan view of a magnetic slat device, according to another embodiment of the invention, wherein the longitudinal edge portions of the magnetic slat device are provided with edge covers disposed thereon.
FIG. 4B is an end view of the magnetic slat device of FIG. 4A.

A first exemplary embodiment of the magnetic slat device is seen generally at 10 in FIGS. 1-3. Initially, referring to FIGS. 1A-2B, it can be seen that the magnetic slat device 10 generally comprises an elongate slat body 12, the elongate slat body 12 having a generally curved cross-section (see FIG. 2B) with a first generally concave surface 13 and a second generally convex surface 15, the elongate slat body 12 further including a first longitudinal edge portion 12*a* and a second longitudinal edge portion 12*b* disposed opposite to the first longitudinal edge portion 12*a*; and a plurality of magnets 26 coupled to the elongate slat body 12, each of the plurality of magnets 26 being spaced apart from one another along a length of the elongate slat body 12 (see FIG. 1A), and each of the plurality of magnets 26 being disposed between the first and second longitudinal edge portions 12*a*, 12*b* of the elongate slat body 12. Each of the plurality of magnets 26 of the magnetic slat device 10 is configured to exert a magnetic force on a magnetic object, such as another magnetic slat device or a metal sheet.

In the illustrated embodiment, it can be seen that the first and second longitudinal edge portions 12*a*, 12*b* of the elongate slat body 12 comprise bent edge portions (see FIGS. 2B and 3) that extend outwardly from the elongate slat body 12 in generally opposite directions (i.e., the bent edge portions 12*a*, 12*b* of the elongate slat body 12 are spaced apart from one another by approximately 180 degrees). With particular reference to FIG. 3, it can be seen that each of the bent edge portions 12*a*, 12*b* comprises a first surface 17 that is connected to the first generally concave surface 13 of the elongate slat body 12 and a second surface 19 that is connected to the second generally convex surface 15 of the elongate slat body 12. The first surface 17 of each of the bent edge portions 12*a*, 12*b* is disposed generally opposite to the second surface 19 of each of the bent edge portions 12*a*, 12*b*. In some embodiments, the elongate slat body 12 is provided with one or more strips of photoluminescent tape disposed along the length thereof (e.g., on the second generally convex surface 15 of the slat body 12). Advantageously, a slat device 10 provided with photoluminescent tape disposed thereon can be used to illuminate an area for safety or convenience.

The elongate slat body 12 can be formed using various suitable materials. For example, the elongate slat body 12 could be made from a suitable metal or polymer. Although, the material selected for the elongate slat body 12 is preferably both resilient and bendable so that the magnetic slat device 10 can be bent into a plurality of different shapes for various applications, but then, is capable of regaining its original, generally linear shape after being removed from its deformed arrangement.

As best shown in FIG. 1A, and in the enlarged views of FIGS. 2A and 2B, each of the plurality of plurality of magnets 26 is attached to the elongate slat body 12 by means of a magnet mounting member 14 in the illustrative embodiment.

Figures 5A, 5B:
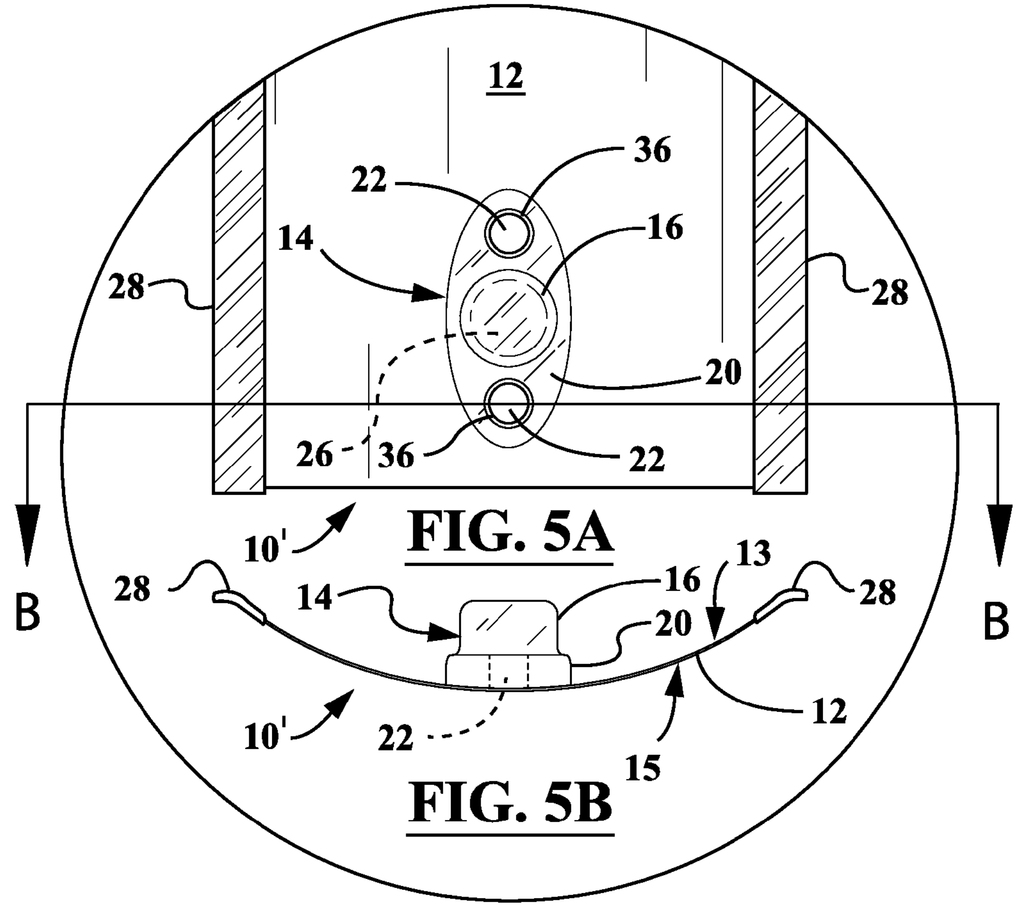
FIG. 5A is a partial enlarged plan view of an end of the magnetic slat device of FIGS. 4A and 4B (Detail “B”)
FIG. 5B is an enlarged end view of the magnetic slat device of FIGS. 4A and 4B (Detail “B”)
Figure 6:
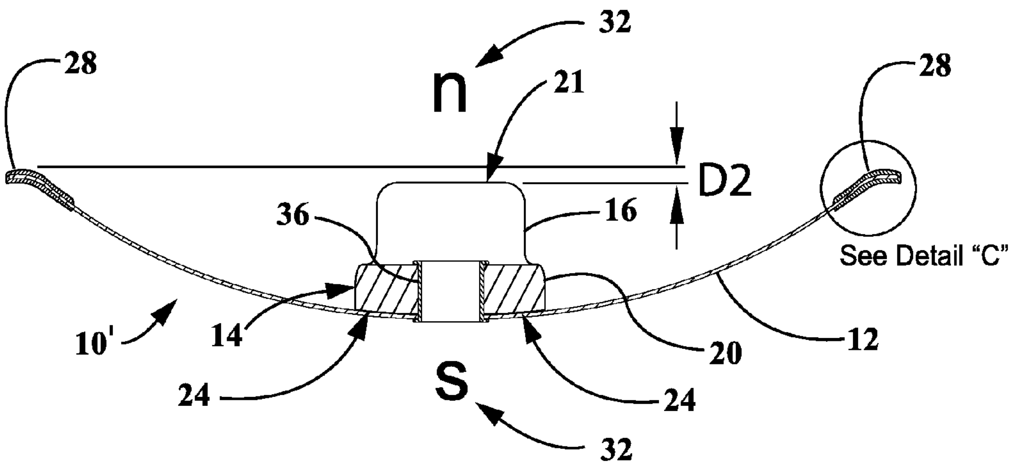
FIG. 6 is an enlarged sectional view of the magnetic slat device of FIGS. 4A and 4B, which is generally cut along the cutting-plane line B-B in FIG. 5A.
Figure 7:
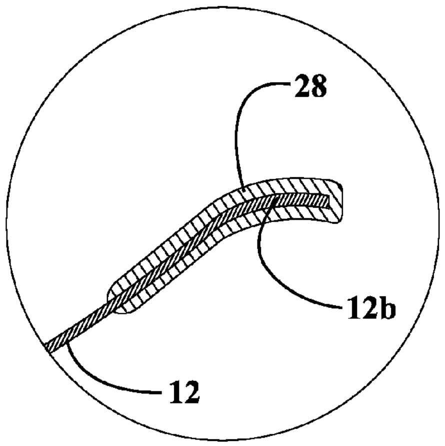
FIG. 7 is a partial enlarged sectional view of an edge portion of the magnetic slat device shown in FIG. 6 (Detail “C”)

Referring to the sectional view of FIG. 3, it can be seen that each magnet mounting member 14 includes a recess 18 (e.g., a cylindrical recess) for receiving its respective magnet 26 (e.g., a respective cylindrical magnet). Each magnet mounting member 14 further includes a central body portion 16 and a peripheral flange portion 20 (see e.g., FIGS. 2A and 2B) and a slightly curved surface 24 (see FIG. 3) that lies contiguous to the first generally concave surface 13 of the slat body 12. The recess 18 receiving the magnet 26 is disposed in the central body portion 16 of the magnet mounting member 14. In addition, as best illustrated in FIGS. 2A and 2B, the peripheral flange portion 20 of each magnet mounting member 14 comprises two oppositely disposed apertures 22 for accommodating a respective fastener passing therethrough (i.e., each magnet mounting member 14 comprises a pair of apertures). A first aperture of each pair of apertures 22 is disposed on a first side of a respective one of the plurality of magnets 26, and a second aperture of each pair of apertures 22 is disposed on a second side of a respective one of the plurality of magnets 26. In the embodiment of the invention illustrated in FIGS. 1-3, fasteners in the form of rivets 36 (see e.g., FIGS. 2A, 5A, and 6) are used for securing the magnet mounting members 14 to the slat body 12. However, it is to be understood that other suitable fasteners, such as screws or bolts with nuts may be used for attaching the magnet mounting members 14 to the slat body 12.

Also, in an alternative embodiment of the invention, the peripheral flange portion 20 of the magnet mounting member 14 may be provided without any fasteners disposed therethrough. In this alternative embodiment, each magnet mounting member 14 can be attached to the slat body 12 by using a suitable adhesive (e.g., a suitable glue).

Turning to the sectional view of FIG. 3, it can be seen that each of the magnets 26 in the illustrated embodiment comprises a first surface 27 and a second curved surface 34 disposed generally opposite to the first surface 27. Throughout the figures, the letters "n" and "s" denote the polarity 32 of the magnet 26. In FIG. 3, it can be seen that the first surface 27 of the magnet 26 corresponds to its north pole "n", while the second curved surface 34 of the magnet 26 corresponds to its south pole "s". In some embodiments, the shape and pole orientation of the magnets 26 is clearly marked using indicia on one of the surfaces 13, 15 of the slat body 12. As shown in this typical sectional view, the second curved surface 34 of each magnet 26 is disposed generally contiguous to the first generally concave surface 13 of the elongate slat body 12. Also, referring to FIG. 3, it can be seen that the first surface 21 of each magnet mounting member 14 is spaced apart from the first surfaces 17 of the bent edge portions 12*a*, 12*b* by a predetermined distance D1 (e.g., 2 millimeters) such that none of the plurality of magnets 26 protrude beyond the first surfaces 17 of the bent edge portions 12*a*, 12*b* when the elongate slat body 12 is in an undeformed state. Similarly, the first surface 27 of each magnet 26 is spaced apart from the first surface 17 of the bent edge portions 12*a*, 12*b* by a predetermined distance (D1 plus the thickness, e.g., 1 mm, of the top portion of the magnet mounting member 14 in FIG. 3) such that none of the plurality of magnets 26 protrude beyond the first surfaces 17 of the bent edge portions 12*a*, 12*b* when the elongate slat body 12 is in an undeformed state.

In an exemplary embodiment of the invention, the magnets 26 comprise neodymium magnets. For example, the magnets 26 may be epoxy-coated neodymium iron boron and can be either ringed with, or cupped in stainless steel or another appropriate substance. Although, other suitable types of magnets may also be used provided that they are capable of producing a sufficiently strong magnetic force. Also, in the illustrated embodiment, it can be seen that the magnets 26 are generally cylindrical in shape (see e.g., FIGS. 2A-3) with a curved second surface 34 that generally matches the contour of the first generally concave surface 13 (see FIG. 3). However, it is to be understood that magnets having other suitable shapes may be also be utilized. For example, a magnet having a square or rectangular footprint with a generally flat second surface may be used in lieu of the illustrated cylindrical magnet. A magnet having a generally flat second surface is particularly suitable for use with a slat body 12 having a generally flat region 38, as will be described hereinafter in conjunction with the embodiment of FIGS. 22A and 22B.

In one or more embodiments, the magnetic slat devices 10, 10', 10", 10'", 10' described herein are provided as part of a kit. For example, the magnetic slat kit may comprise a plurality of magnetic slat devices 10, wherein each of the plurality of magnetic slat devices 10 may include the various features described in conjunction with the illustrative embodiments explained herein. In the magnetic slat kit, each of the plurality of magnetic slat devices 10 is configured to be coupled to one another or to an external object (e.g., a metallic object, such as a metal door or wall panel) by means of magnetic forces produced by the plurality of magnets 26 provided on the magnetic slat devices 10. In addition to the magnetic slat devices 10, 10', 10", 10'", 10"", the slat kit may comprise other components that can be used as attachment devices and accessories for the magnetic slat devices. For example, the kit may be provided with peg members that are designed to fit into the apertures 54 in FIG. 27. The peg members can be used to attach stacked slat devices so that slat devices can be layered on top of one another in an assembly. Advantageously, the layering of the slat devices would increase strength of the assembly. As another example, the kit may additionally comprise blank slats with apertures 54, but no magnets disposed thereon, which can be connected to the magnetic slat devices 10 using the peg members or other suitable attachment means. Similar to the elongate strengthening members 30, the blank slats could be used to strengthen the structure that is built with the magnetic slat devices 10. As yet another example, the kit may comprise accessories that are designed to easily attach to the apertures 54 in the slat body 12, such as: (i) motor modules with opposed peg members, (ii) power supply (battery) modules with opposed peg members, (iii) wheel modules including one or more wheels mounted thereon, and (iv) generator modules with opposed peg members for generating power for other accessories. In one embodiment, these accessories are sized so as to fit within the internal football-shaped cavity formed by the magnetic slat devices 10 illustrated in FIGS. 8-10 and 12. Advantageously, the apertures 54 in the slat body 12 enable a vast array of interchangeable accessories to be used with the devices 10 described herein.

Figure 8:
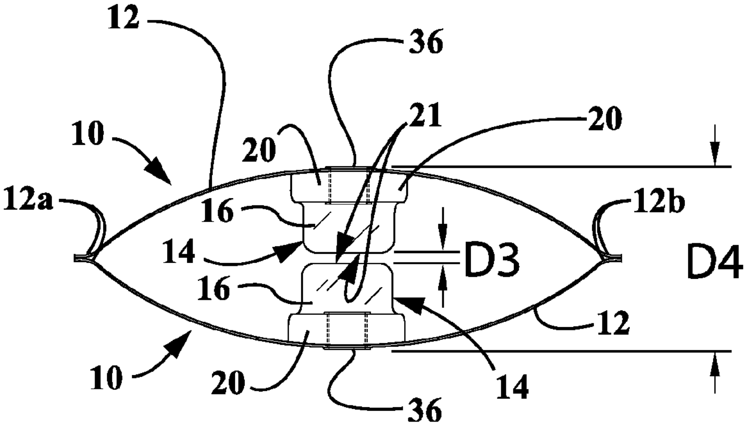
FIG. 8 is an end view of two magnetic slat devices disposed together, according to one embodiment of the invention, wherein the generally concave surfaces of the magnetic slat devices are facing one another, and wherein a slat body of each of the magnetic slat devices is in an undeformed state.
Figure 9:
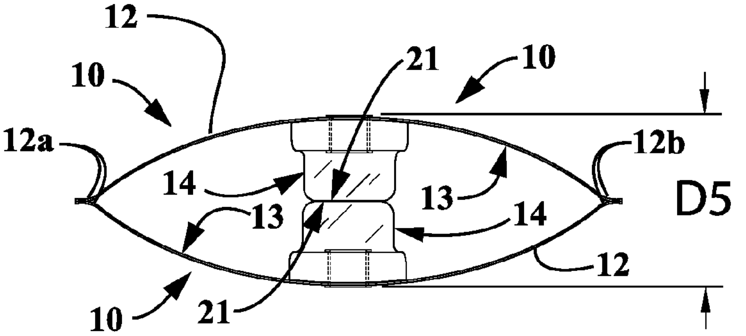
FIG. 9 is another end view of the two magnetic slat devices illustrated in FIG. 8, wherein the slat body of each of the magnetic slat devices is in a deformed state such that the magnet mounting members of the magnetic slat device are touching one another.

Next, with reference to FIGS. 8-18, several exemplary ways in which the magnetic slat devices 10 can be connected together will be described. For example, a plurality of magnetic slat devices 10 provided as part of a magnetic slat kit can be connected together in these exemplary ways. Initially, referring to FIGS. 8-12, it can be seen that a first magnetic slat device 10 can be attached to a second magnetic slat device 10 such that the first generally concave surface 13 of the first device 10 faces, in an opposing manner, the first generally concave surface 13 of the second device 10 and the plurality of magnets 26 in magnet mounting members 14 are encapsulated between the slat bodies 12 of the first and second devices 10 (see e.g., FIG. 9). As shown in FIGS. 8 and 9, when the magnetic slat devices 10 are connected together in this manner, the slat bodies 12 of the first and second devices 10 are each configured to resiliently deform such that a surface 21 of each magnet mounting member 14 (or a surface of each magnet 26, if exposed) of the first device 10 lies generally contiguous to a surface 21 of each magnet mounting member 14 (or to a surface of each magnet 26, if exposed) of the second device 10. For example, as explained above, the slat body 12 of magnetic slat device 10 can be formed from a resilient and bendable material that flexes when the magnet force(s) generated by the attraction of the north and south poles of the adjacent magnets 26 on the two devices 10 (see FIG. 11) pull the two devices 10 together in a generally football-shaped, cross-sectional configuration (refer to FIGS. 9, 10, and 12). In FIGS. 11, 13, 15, and 17, oval-shaped magnetic field lines are disposed between the north and south poles of one set of the magnets 26 (i.e., between the fourth set of magnets 26 located up from the bottom of these figures) to diagrammatically illustrate the magnetic attractive forces of the north and south poles of the adjacent magnets 26 on the two devices 10.

In FIG. 8, the slat bodies 12 of each magnetic slat device 10 are not yet deformed or flexed by the magnetic attraction forces of the magnets 26. In the undeformed state, a gap distance D3 (e.g., 1-2 mm) exists between the surfaces 21 of the magnet mounting members 14. The distance D3 is the flexure amount of the slat bodies 12 when they compressed together by the magnetic attraction forces of the magnets 26. The gap distance D3 is equal to the difference between the distance D4, which is measured from the topmost point of the unflexed upper device 10 in FIG. 8 to the bottommost point of the unflexed lower device 10 in FIG. 8, and the distance D5, which is measured from the topmost point of the flexed upper device 10 in FIG. 9 to the bottommost point of the flexed lower device 10 in FIG. 9 (i.e., the gap distance D3 is equal to the distance D4 minus the distance D5). As illustrated in FIGS. 8 and 9, the slat bodies 12 flex so that the surfaces 21 of the magnet mounting members 14 touch (or so that the surfaces 27 of the magnets 26 nearly touch one another, as they are just separated by the covering thickness of the magnet mounting members 14). When the slat bodies 12 flex, and the surfaces 21 of the magnet mounting members 14 touch one another (see FIG. 9), the composite structure formed by the two magnetic slat devices 10 becomes stronger as their longitudinal edge portions 12*a*, 12*b* are pressed against one another.

Figure 10:
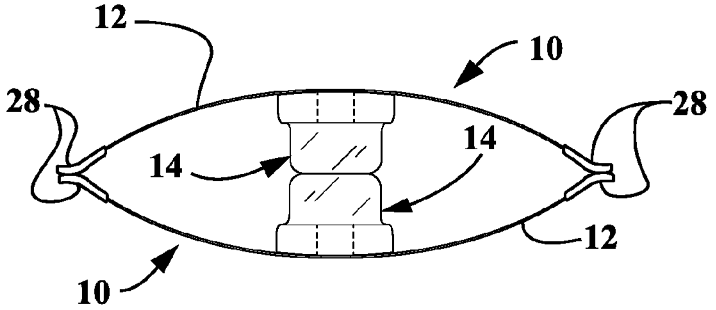
FIG. 10 is yet another end view of two magnetic slat devices disposed together, which is similar to FIG. 9, except that the longitudinal edge portions of the magnetic slat device are provided with edge covers disposed thereon.
Figure 11:
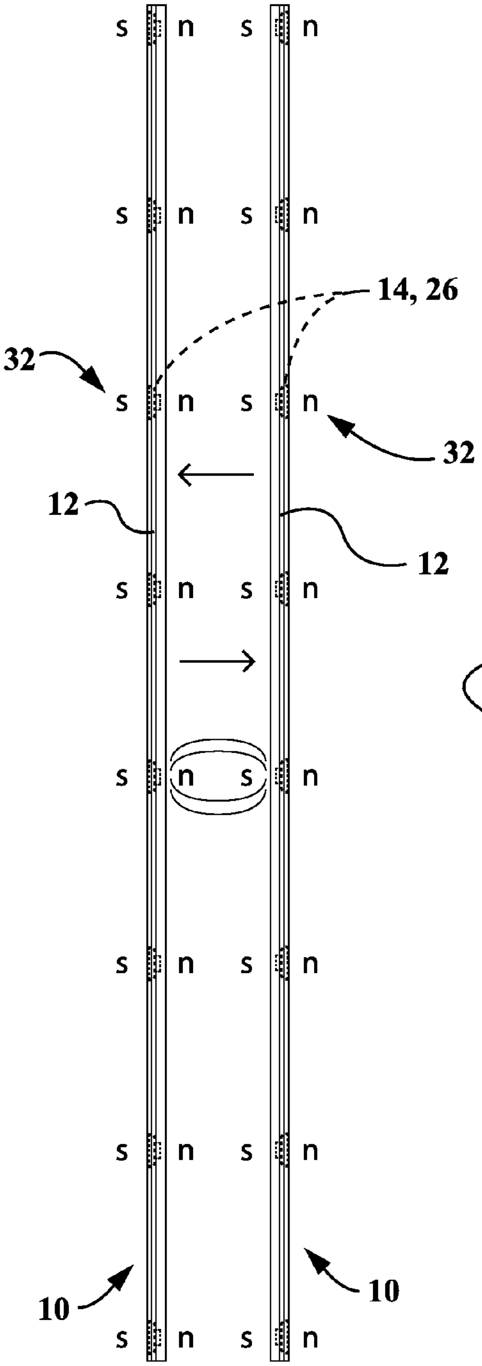
FIG. 11 is a side view of two magnetic slat devices prior to being attached to one another, wherein the generally concave surfaces of the magnetic slat devices are facing one another.
Figure 12:
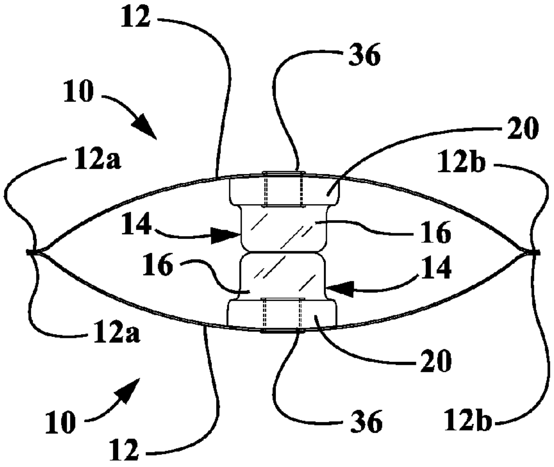
FIG. 12 is an end view of two magnetic slat devices disposed together, which is generally the same as that shown in FIG. 9.

The composite structure of FIG. 10 is similar to that of FIG. 9, except that the longitudinal edge portions 12*a*, 12*b* of the slat bodies 12 are each provided with edge covers 28 disposed thereon. For example, the edge covers 28 can be formed from an elastomeric material (e.g., rubber strips with pockets) that is fitted over the longitudinal edge portions 12*a*, 12*b*. Similar to that described above with regard to FIG. 9, when the slat bodies 12 flex as a result of the magnetic attraction forces generated by magnets 26, the longitudinal edge portions 12*a*, 12*b* with edge covers 28 are pressed against one another. If the edge covers 28 are formed from a resilient material, such as rubber, the edge covers 28 are capable of forming a water barrier (e.g., to prevent the intrusion of water into the internal football-shaped cavity containing the magnet mounting members 14) when one of the rubber edge covers 28 is firmly pressed against the other of the edge covers 28.

Figure 13:
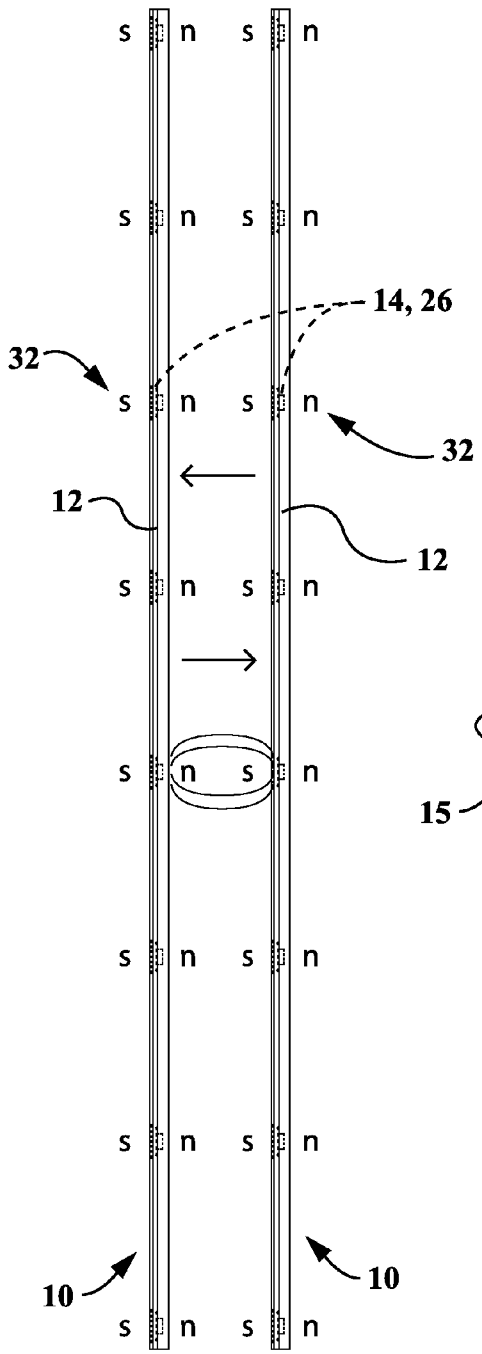
FIG. 13 is a side view of two magnetic slat devices prior to being attached to one another, wherein the generally concave surface of a first magnetic slat device is facing the generally convex surface of a second magnetic slat device.
Figure 14:
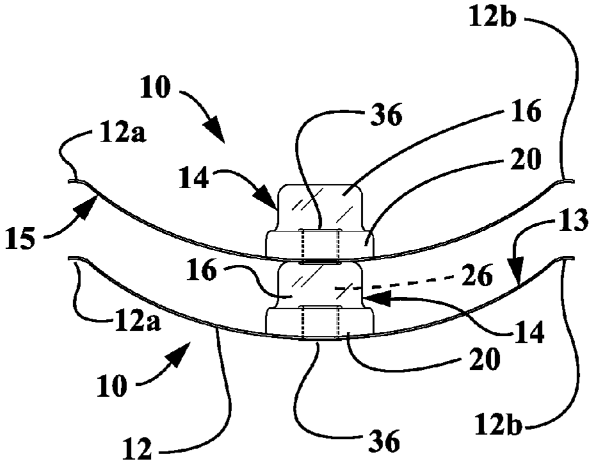
FIG. 14 is an end view of the two magnetic slat devices illustrated in FIG. 13 after being attached to one another, wherein the generally concave surface of the first magnetic slat device is facing the generally convex surface of the second magnetic slat device.

Referring to FIGS. 13 and 14, it can be seen that, in another embodiment of the invention, a first magnetic slat device 10 can be attached to a second magnetic slat device 10 such that the first generally concave surface 13 of the first device 10 (e.g., located on the bottom in FIG. 14) faces, in an opposing manner, the second generally convex surface 15 of the second device 10 (e.g., located on the top in FIG. 14). As shown in the end view of FIG. 14, the generally curved cross-sections of the first and second magnetic slat devices 10 are disposed generally parallel to one another when they are attached in this manner.

Figure 15:
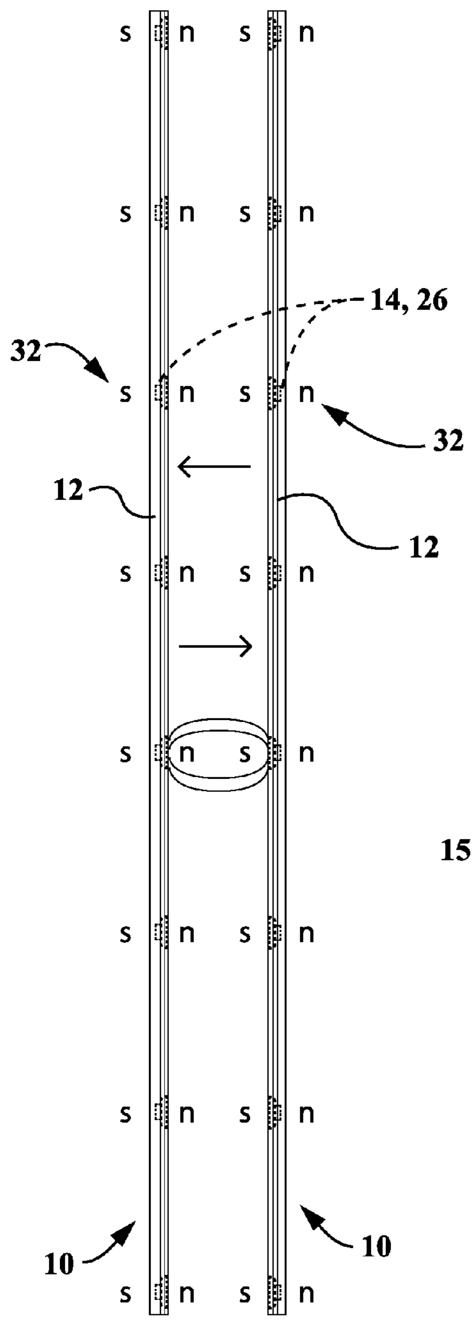
FIG. 15 is a side view of two magnetic slat devices prior to being attached to one another, wherein the generally convex surface of a first magnetic slat device is facing the generally convex surface of a second magnetic slat device.
Figure 16:
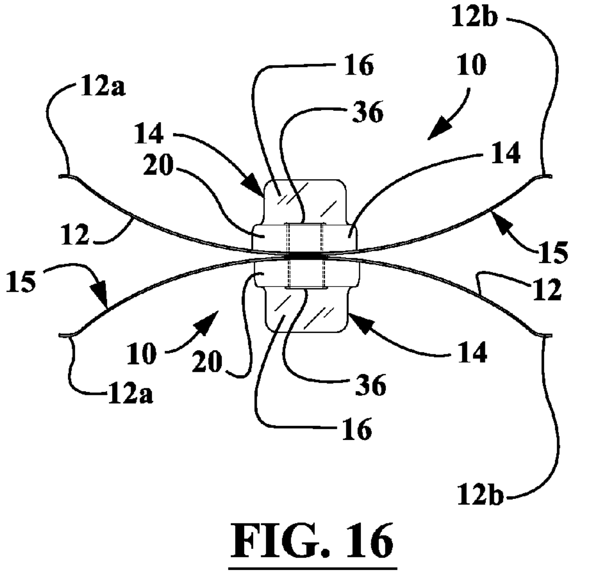
FIG. 16 is an end view of the two magnetic slat devices illustrated in FIG. 15 after being attached to one another, wherein the generally convex surface of the first magnetic slat device is facing the generally convex surface of the second magnetic slat device.

Now, with reference to FIGS. 15 and 16, it can be seen that, in yet another embodiment of the invention, a first magnetic slat device 10 can be attached to a second magnetic slat device 10 such that the second generally convex surface 15 of the first device 10 (e.g., located on the bottom in FIG. 16) faces, in an opposing manner, the second generally convex surface 15 of the second device 10 (e.g., located on the top in FIG. 16). As shown in the end view of FIG. 16, the cross-sections of the first and second magnetic slat devices 10 together form a generally flattened X-type configuration.

Figure 17:
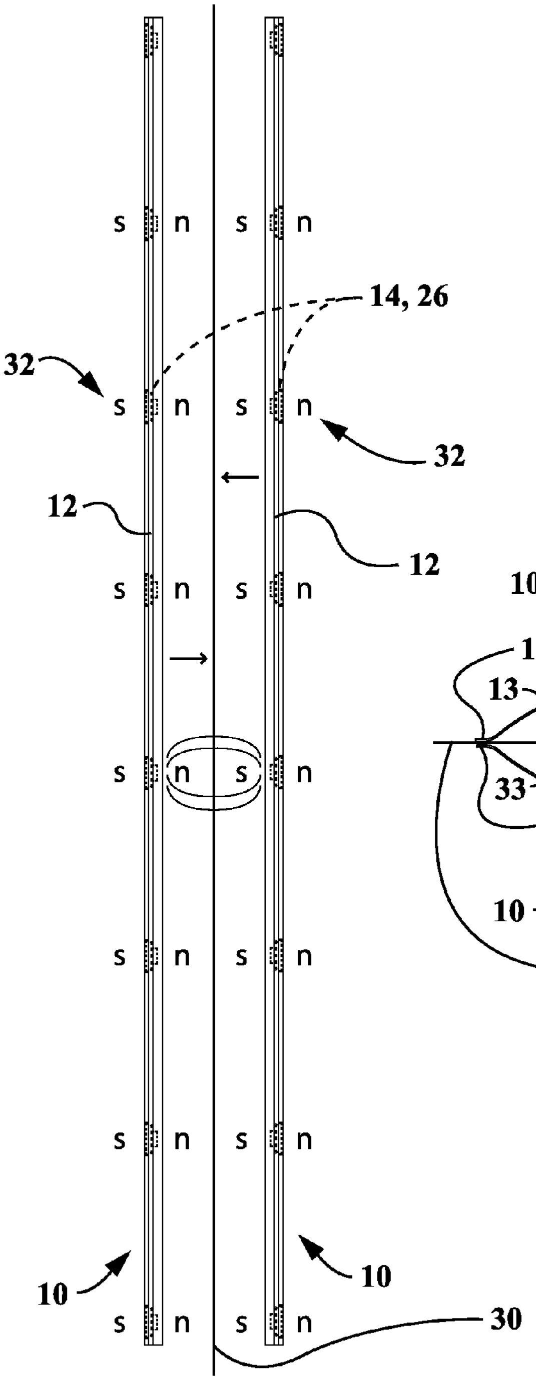
FIG. 17 is a side view of two magnetic slat devices and an elongated strengthening member prior to being attached to one another, wherein the generally concave surfaces of the magnetic slat devices are each facing a respective opposed side of the elongated strengthening member.
Figure 18:
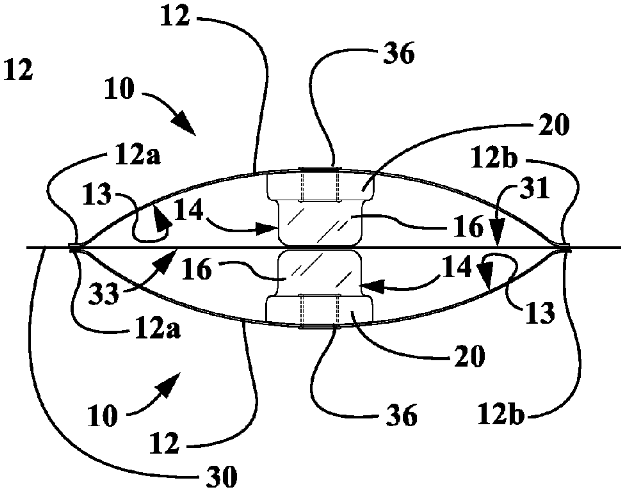
FIG. 18 is an end view of the two magnetic slat devices illustrated in FIG. 17 after being attached to one another and to the elongated strengthening member, wherein the generally concave surfaces of the magnetic slat devices are each facing a respective opposed side of the elongated strengthening member, and the elongated strengthening member is sandwiched between the two magnetic slat devices.

Then, referring to FIGS. 17 and 18, it can be seen that, in still another embodiment of the invention, the magnetic slat kit may further comprise an elongate strengthening member 30 having a first generally planar surface 31 and a second generally planar surface 33 disposed opposite to the first surface 31. In one or more exemplary embodiments, the elongate strengthening member 30 is formed from a generally rigid material, such as metal or a rigid plastic, so that it can increase the overall structural rigidity of the magnetic slat devices 10 that are connected together. In FIGS. 17 and 18, it can be seen that a first magnetic slat device 10 can be attached to a second magnetic slat device 10, and to the elongate strengthening member 30. As shown in the end view of FIG. 18, in this configuration, the first generally concave surface 13 of the first device 10 (e.g., located on the top in FIG. 18) faces, in an opposing manner, the first surface 31 of the elongate strengthening member 30 and the first generally concave surface 13 of the second device 10 (e.g., located on the bottom in FIG. 18) faces, in an opposing manner, the second surface 33 of the elongate strengthening member 30. As such, the elongate strengthening member 30 is sandwiched between the first and second magnetic slat devices 10. The configuration of the first and second magnetic slat devices 10 in FIG. 18 is similar to that of FIGS. 8-10 and 12, except that the elongate strengthening member 30 is sandwiched between the first and second magnetic slat devices 10 in order to provide additional structural rigidity.

A second exemplary embodiment of the magnetic slat device is seen generally at 10' in FIGS. 4A-7. Referring to these figures, it can be seen that, in many respects, the second exemplary embodiment is similar to that of the first embodiment. Moreover, many elements are common to both such embodiments. For the sake of brevity, the elements that the second embodiment of the magnetic slat device has in common with the first embodiment will not be discussed because these components have already been explained in detail above. Furthermore, in the interest of clarity, these elements are denoted using the same reference characters that were used in the first embodiment.

In the second exemplary embodiment, as shown in FIGS. 4A-7, each of the bent edge portions 12*a*, 12*b* of the slat body 12 is provided with an edge cover 28 disposed thereon. In all other respects, the magnetic slat device 10' is generally the same as the magnetic slat device 10. In one or more embodiments, each edge cover 28 is formed from a resilient material, such as a deformable polymeric material (e.g., rubber), that can be fitted over each bent edge portion 12*a*, 12*b*. As shown in the sectional view of FIG. 6, it can be seen that the first surface 21 of each magnet mounting member 14 is spaced apart from the uppermost surface of the edge covers 28 by a predetermined distance D2 (e.g., 2 millimeters) such that none of the magnet mounting members 14 or the plurality of magnets 26 protrude beyond the uppermost surfaces of the edge covers 28 when the elongate slat body 12 is in an undeformed state. Advantageously, when the magnetic slat device 10 is attached to a vertically extending surface, the polymeric edge covers 28 (e.g., rubber edge covers 28) increase the grip of the magnetic slat device 10 on the vertical surface by increasing the frictional surface contact therewith. This is particularly important when heavy objects are being hung from the magnetic slat device(s) 10 (see e.g., FIG. 21). Advantageously, the curved cross-section of the magnetic slat devices 10 also greatly enhances the surface contact of the magnetic slat devices 10 with such a vertical surface because, not only do the central body portions 16 of the magnet mounting members 14 contact the vertical surface, but the longitudinal edge portions 12*a*, 12*b* of the slat body 12 additionally contact the vertical surface, thereby increasing the frictional contact therewith.

Figure 22A:
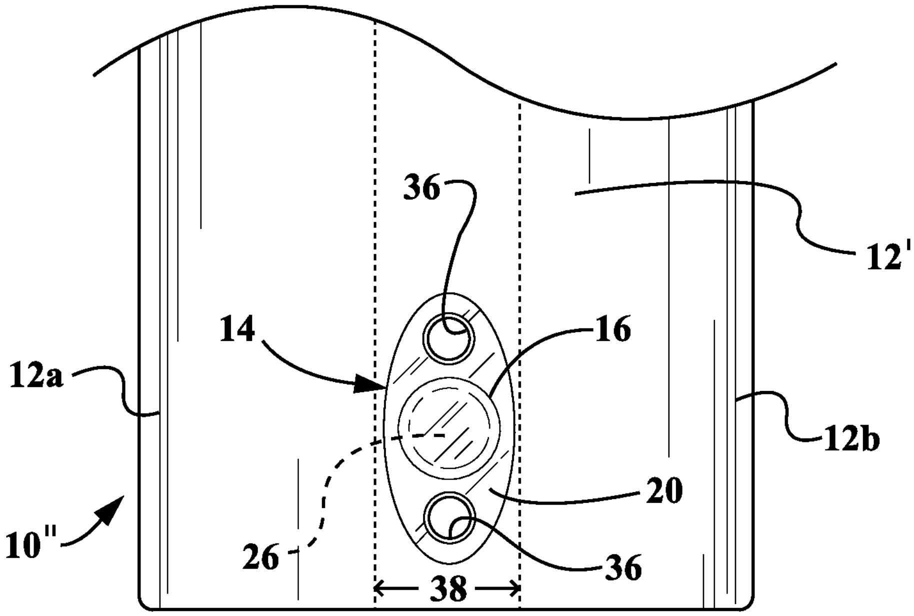
FIG. 22A is a partial enlarged plan view of an end of a magnetic slat device, according to another embodiment of the invention, wherein the slat body of the magnetic slat device comprises a generally flat region.
Figure 22B:
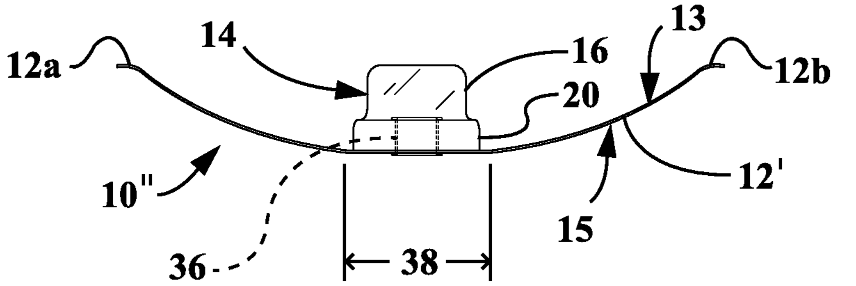
FIG. 22B is an enlarged end view of the magnetic slat device of FIG. 22A.
Figure 23:
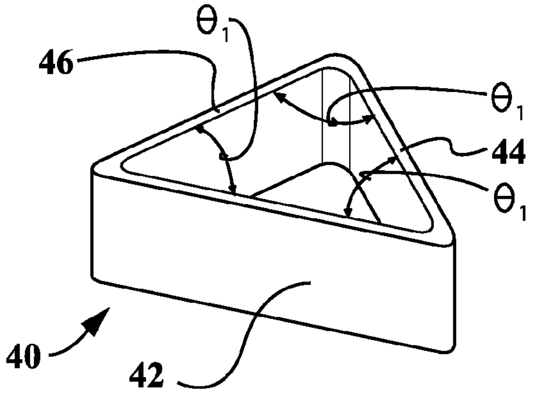
FIG. 23 is a perspective view of a triangular connecting member for connecting a plurality of magnetic slat devices together.

A third exemplary embodiment of the magnetic slat device is seen generally at 10" in FIGS. 22A-22B. Referring to these figures, it can be seen that, in many respects, the third exemplary embodiment is similar to that of the preceding two embodiments. Moreover, many elements are common to all of the embodiments. For the sake of brevity, the elements that the third embodiment of the magnetic slat device has in common with the first and second embodiments will not be discussed because these components have already been explained in detail above. Furthermore, in the interest of clarity, these elements are denoted using the same reference characters that were used in the first and second embodiments.

In the third exemplary embodiment, as shown in FIGS. 22A-22B, the elongate slat body 12' of the magnetic slat device 10" is provided with a generally flat region 38 in a central portion of the generally curved cross-section. As best illustrated in the end view of FIG. 22B, the generally flat region 38 comprises a generally planar surface (i.e., a flat linear plate-like surface). In all other respects, the magnetic slat device 10" is generally the same as the magnetic slat device 10. Advantageously, the generally flat region 38 of the slat body 12' enables magnets 26 with generally flat second surfaces to be used, rather than curved second surfaces 34 as described above. Also, the generally flat region 38 of the slat body 12' enables magnet mounting members 14 with generally flat second surfaces to be utilized, rather than the slightly curved second surfaces 24 explained above. As such, providing a generally flat region 38 on the elongate slat body 12', would likely reduce the material and/or labor costs associated with the magnets 26 and the magnet mounting members 14, but may result in a consequential increase in the material and/or labor costs of the elongate slat body 12'. Also, providing a generally flat region 38 on the elongate slat body 12' makes it much easier to use one-quarter (¼) inch cube magnets that are arranged in a Halbach array or arrangement. In one or more embodiments, a series of magnets are arranged in varying orientations in a Halbach array so that an extremely strong magnetic field is created on one side of the magnetic slat device 10, while a relatively weak magnetic field is created on the opposite side of the magnetic slat device 10. A magnetic slat device 10 having a Halbach array of magnets 26 disposed thereon is beneficial in electromagnetic levitation applications of the device. In addition, providing a generally flat region 38 on the elongate slat body 12' makes it much easier to use the magnetic slat devices 10 in applications requiring the formation of a track assembly therefrom (e.g., to accommodate wheels of automated devices, such as robots, etc.).

In an exemplary embodiment, the generally flat region 38 of the slat body 12' has a width of approximately one-quarter (¼) of an inch. Although, it is to be understood that other suitable widths for the generally flat region 38 may also be used.

Figure 27:
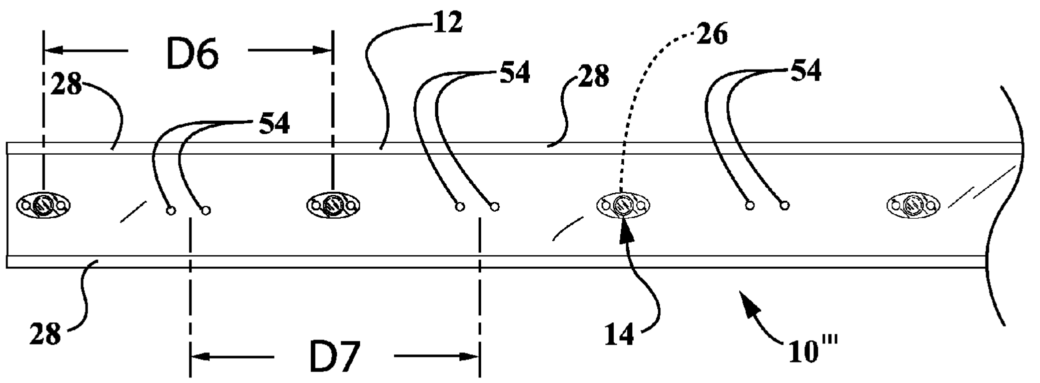
FIG. 27 is a partial plan view of a magnetic slat device, according to yet another embodiment of the invention, wherein the slat body is provided with spaced apart pairs of apertures disposed therein.

A fourth exemplary embodiment of the magnetic slat device is seen generally at 10'" in FIG. 27. Referring to this figure, it can be seen that, in many respects, the fourth exemplary embodiment is similar to that of the preceding three embodiments. Moreover, many elements are common to all of the embodiments. For the sake of brevity, the elements that the fourth embodiment of the magnetic slat device has in common with the preceding embodiments will not be discussed because these components have already been explained in detail above. Furthermore, in the interest of clarity, these elements are denoted using the same reference characters that were used in the preceding three embodiments.

In the fourth exemplary embodiment, as shown in the partial plan view of FIG. 27, the elongate slat body 12 further comprises a plurality of apertures 54 passing therethrough. In FIG. 27, it can be seen that the apertures 54 are arranged together in pairs, wherein the centerlines between apertures 54 of each pair are spaced by a predetermined distance D7. In other words, each of the plurality of apertures 54 is spaced apart from one another along a length of the elongate slat body by a predetermined distance D7 (i.e., the first apertures of each pair are spaced apart from one another by a distance D7 and the second apertures of each pair are spaced apart from one another by a distance D7). In one exemplary embodiment, the predetermined distance D7 between the centerlines of paired apertures 54 is approximately six (6) inches. Although, those of ordinary skill in the art will appreciate that other suitable distance values may also be used for the predetermined distance D7, such as three (3) inches.

In one or more embodiments, when the magnetic slat devices 10'" are provided as part of a slat kit, it is to be understood that the spacing between apertures 54 is standardized among the slat devices provided in the kit so that the slat devices could be easily connected to one another to build a desired structure. For example, when slat devices having a smaller width (e.g., ¼ inch) are provided in conjunction with slat devices having a larger width (e.g., 1 inch), the smaller width slat devices are provided with the same aperture 54 pattern as the larger width slat devices.

Referring again to FIG. 27, it can be seen that the centerlines of the magnet mounting members 14 are spaced apart from one another by a predetermined distance D6. In one exemplary embodiment, the predetermined distance D6 between the centerlines of magnet mounting members 14 is approximately six (6) inches. Although, those of ordinary skill in the art will appreciate that other suitable distance values may also be used for the predetermined distance D6, such as three (3) inches or twelve (12) inches.

Figure 28:
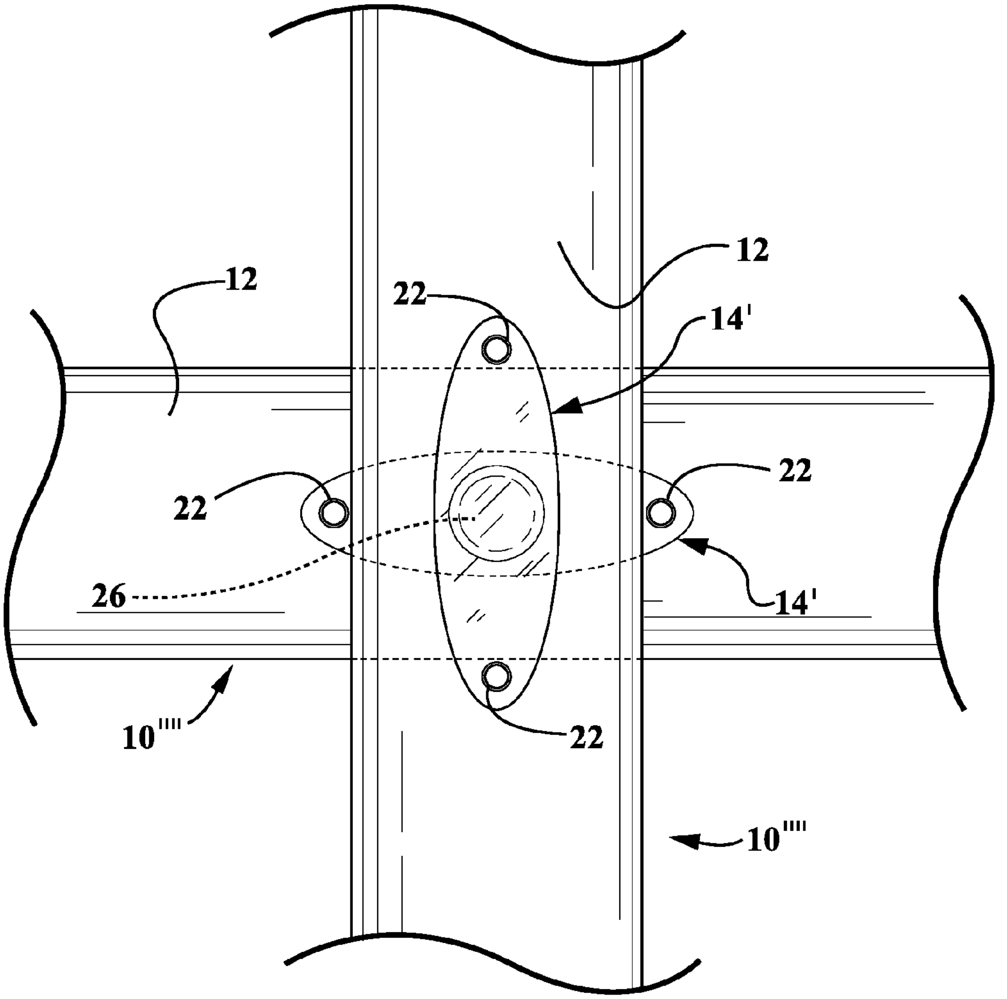
FIG. 28 is a partial plan view of two intersecting magnetic slat devices, according to still another embodiment of the invention, wherein the slat bodies are provided with elongated magnetic mounting members having apertures disposed therein, the apertures being spaced apart from one another by a distance that is slightly greater than the width of the slat body.

A fifth exemplary embodiment of the magnetic slat device is seen generally at 10"" in FIG. 28. Referring to this figure, it can be seen that, in many respects, the fifth exemplary embodiment is similar to that of the preceding four embodiments. Moreover, many elements are common to all of the embodiments. For the sake of brevity, the elements that the fifth embodiment of the magnetic slat device has in common with the preceding embodiments will not be discussed because these components have already been explained in detail above. Furthermore, in the interest of clarity, these elements are denoted using the same reference characters that were used in the preceding four embodiments.

In the fifth exemplary embodiment, as shown in the partial plan view of FIG. 28, two magnetic slat devices 10"" are shown intersecting one another. As shown in this figure, each of the slat bodies 12 of the magnetic slat devices 10'''' is provided with elongated magnetic mounting members 14' having apertures 22 disposed therein. The flange portion of each magnetic mounting member 14' is elongated, as compared to the previously described magnetic mounting members 14, in order to produce a greater spacing distance between the apertures 22. In particular, the apertures 22 are spaced apart from one another by a distance that is slightly greater than the width of the slat body 12 (e.g., 1¹⁄₁₆ inches for a 1 inch wide slat device or ⅞ of an inch for a ¾ inch wide slat device). Advantageously, this enables the apertures 22 of the elongated magnetic mounting members 14' to be used for fastening two intersecting magnetic slat devices 10'''' to one another, as illustrated in FIG. 28. For example, suitable fasteners, even string, can be disposed through the apertures 22 so as to secure one magnetic slat device 10'''' to another. Also, the holes passing through the rivets 36 described above can be used for accommodating fastening means that secure the magnetic slat devices 10'''' to one another (e.g., a string can pass through the holes in the rivets 36).

Figure 19:
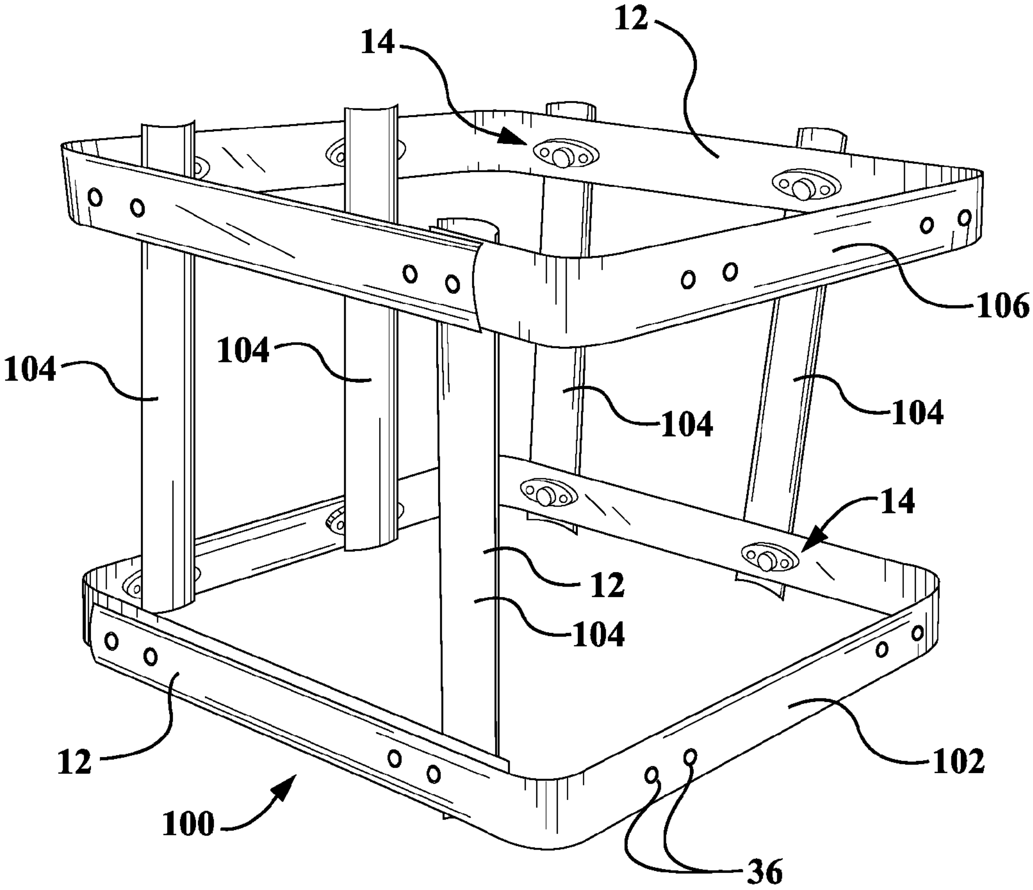
FIG. 19 is a perspective view of an exemplary structure that can be created using a plurality of magnetic slat devices, according to one embodiment of the invention.

A first exemplary structure that can be constructed using the magnetic slat devices 10, 10', 10'', 10''', 10'''' described herein is seen generally at 100 in FIG. 19 (e.g., formed from magnetic slat devices that are furnished as part of a magnetic slat kit). As illustrated in FIG. 19, the bottom base section 102 of the structure 100 can be formed by bending a flexible slat body 12 of a magnetic slat device 10 into a square shape. Similarly, the top frame section 106 of the structure 100 can be formed by bending a flexible slat body 12 of a magnetic slat device 10 into a square shape that is similar to that of the base section 102. And, as shown in FIG. 19, the top frame section 106 of the structure 100 can be elevated above the base section 102 by using a plurality of vertical support members 104 (i.e., formed from generally linear magnetic slat devices 10 that are unbent). While a total of five (5) vertical support members 104 are shown in FIG. 19, it is to be understood that a fewer number (e.g., three) or a greater number (e.g., six or eight) vertical support members 104 can be used depending on the needs of a particular structure 100 (e.g., a greater number of vertical support members 104 would be required if the top frame section 106 was required to bear a great deal of weight).

Figure 20:
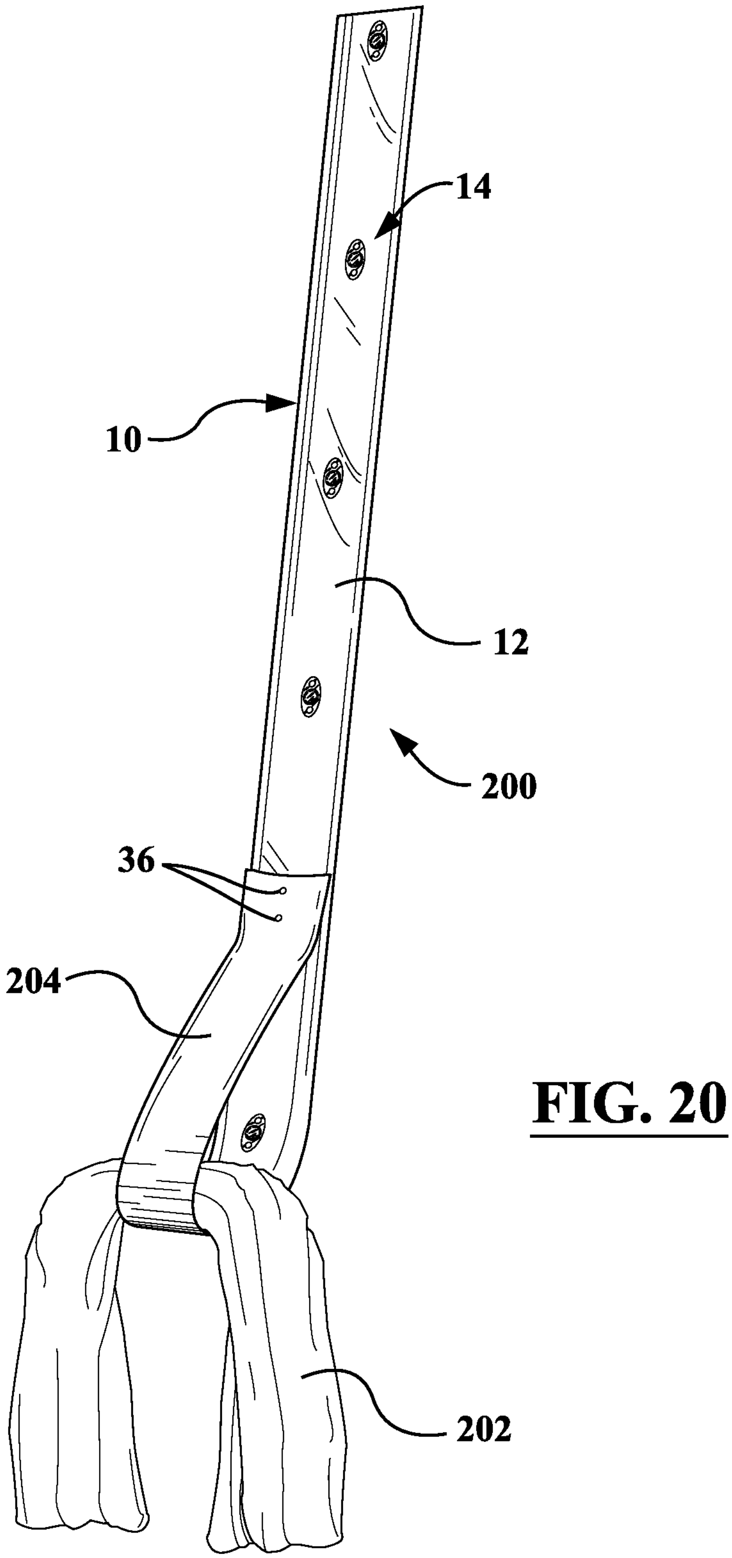
FIG. 20 is a perspective view of an exemplary hanging loop that can be created using a magnetic slat device, according to one embodiment of the invention.

A second exemplary structure that can be constructed using one of the magnetic slat devices 10, 10', 10'', 10''', 10'''' described herein is seen generally at 200 in FIG. 20 (e.g., a magnetic slat device 10 that is furnished as part of a magnetic slat kit). As illustrated in FIG. 20, the end portion 204 of a magnetic slat device 10 is bent into a loop configuration so that it is capable of holding an object, such as the towel or rag 202. The looped end portion 204 of the magnetic slat device 10 can be formed by bending the flexible slat body 12 of the magnetic slat device 10 into the desired loop shape, and then, attaching the free end of the looped portion 204 to the generally straight portion of the slat body 12 (e.g., using rivets 36, as illustrated in FIG. 20).

Figure 21:
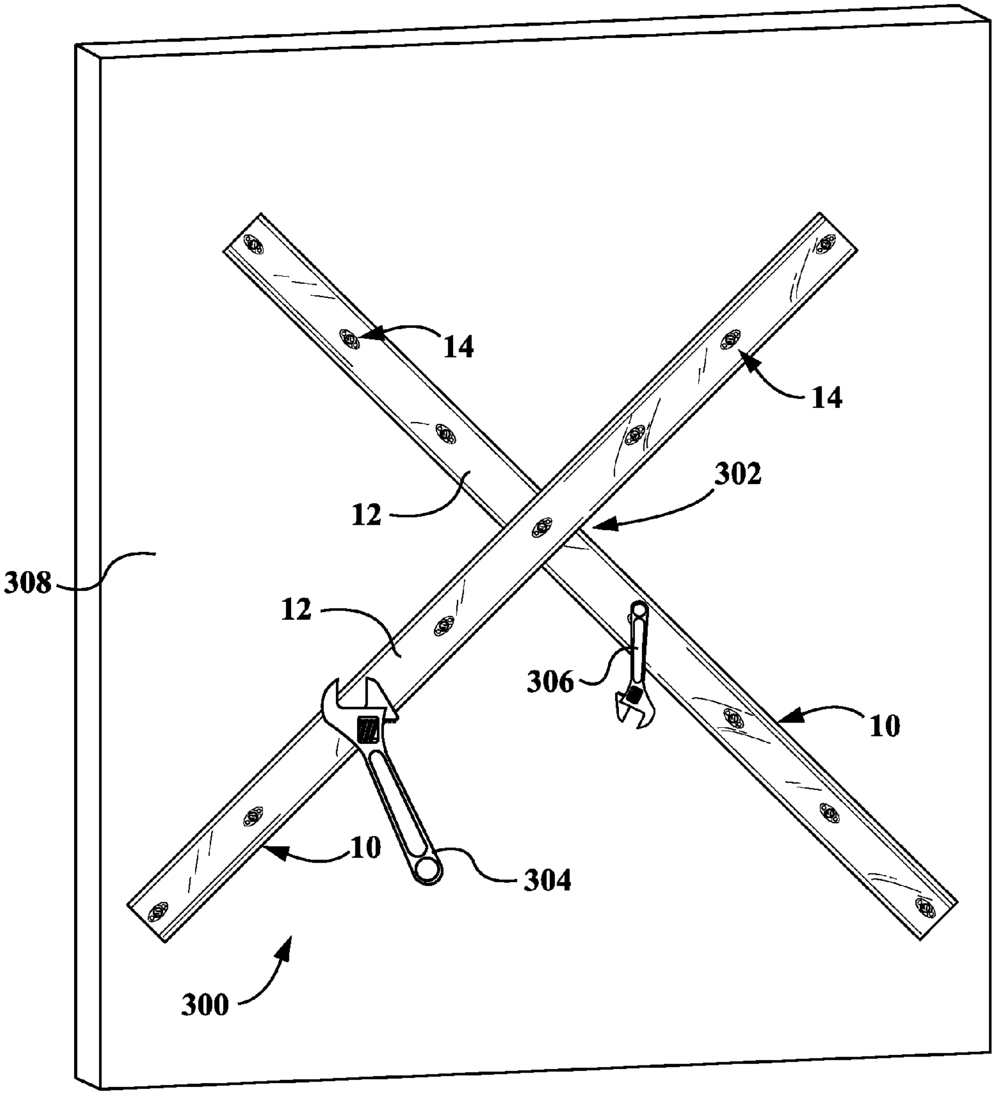
FIG. 21 is a perspective view of an exemplary hanging structure that can be created using a plurality of magnetic slat devices, according to one embodiment of the invention.

A third exemplary structure that can be constructed using the magnetic slat devices 10, 10', 10'', 10''', 10'''' described herein is seen generally at 300 in FIG. 21 (e.g., formed from magnetic slat devices that are furnished as part of a magnetic slat kit). As illustrated in FIG. 21, two magnetic slat devices 10 can be arranged in an "X" configuration so as to form a tool hanging device 300. In FIG. 21, the two magnetic slat devices 10 intersect at a location 302. Because each magnetic slat device 10 contains a plurality of magnets 26 disposed along the length thereof, the magnetic slat devices 10 adhere to a magnetic object, such as the metal panel or door 308 in FIG. 21. As described above, the magnetic slat devices 10 are also attracted to each other. Using the tool hanging device 300 illustrated in FIG. 21, a plurality of different tools (e.g., large adjustable crescent wrench 304 and small adjustable crescent wrench 306) or other metallic objects can be easily hung from a metal wall panel 308, or the like. In addition, non-metallic tools or other objects (e.g., with wood handles) also can be supported from the tool hanging device 300 by slipping a portion of the tool or object behind or between slat devices 10, or by using the apertures 54 of the FIG. 27 embodiment to hang hooks from the slat devices 10. This arrangement allows anything made from non-metallic materials, such as cloth, plastic or paper, to be easily supported using the device 300.

Figure 24:
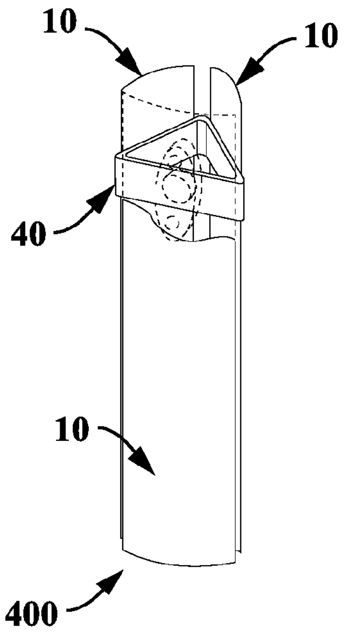
FIG. 24 is a partial cutaway perspective view illustrating a plurality of magnetic slat devices connected together using the triangular connecting member of FIG. 23.

Now, with reference to FIGS. 23-26, exemplary connector members that can be used to attach magnetic slat devices 10 to one another will be described. Initially, referring to FIG. 23, a first type of connecting member will be explained. As shown in this figure, the first type of slat connecting member 40 is triangular-shaped with a first side member 42, a second side member 44, and a third side member 46. In the illustrated embodiment, the slat connecting member 40 is generally an equilateral triangle wherein an angle $\theta_1$ between the side members 42, 44, 46 is approximately equal to 60 degrees. In FIG. 24, it can be seen that the triangular-shaped connecting member 40 can be used to connect three (3) magnetic slat devices 10 together to form a composite structure 400 (i.e., a triangular-shaped beam member 400).

Figure 25:
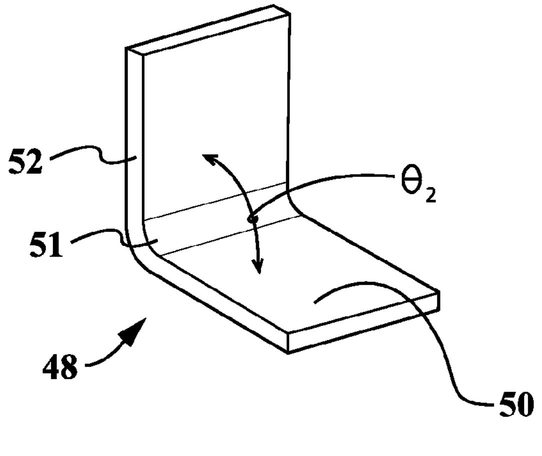
FIG. 25 is a perspective view of an L-shaped connecting member for connecting a plurality of magnetic slat devices together.
Figure 26:
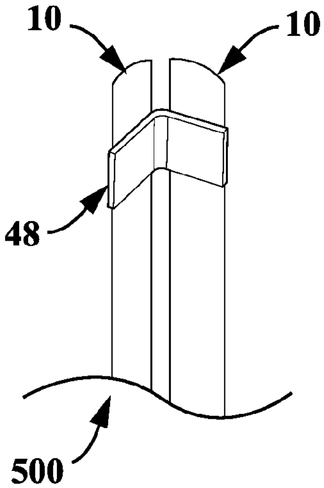
FIG. 26 is a partial perspective view illustrating a plurality of magnetic slat devices connected together using the L-shaped connecting member of FIG. 25.

Next, referring to FIG. 25, a second type of connecting member will be explained. As shown in this figure, the second type of slat connecting member 48 is L-shaped with a first side member 50 and a second side member 52. In the illustrated embodiment, the first and second side members 50, 52 are disposed generally perpendicular to one another (i.e., forming an angle $\theta_2$ equal to approximately 90 degrees). In FIG. 25, it can also be seen that the first and second side members 50, 52 are connected together by filleted or radiused portion 51. Turning to FIG. 26, it can be seen that the L-shaped slat connecting member 48 can be used to connect two (2) magnetic slat devices 10 together to form a composite structure 500 (i.e., a L-shaped beam member 500).

In addition, it is to be understood that other types of connector members can be used to attach magnetic slat devices 10 to one another. For example, a clamshell-type connector clip with a spring-loaded hinge and two pins or prongs, which correspond to the paired apertures 54, could be used to attach magnetic slat devices 10 in some embodiments of the invention. As another example, a two-piece connector clip with two pins or prongs, which correspond to the paired apertures 54, could be used to attach magnetic slat devices 10 together (in both perpendicular and linear arrangements). Preferably, the internal curvature of the clamshell-type connector clip and two-piece connector clip would correspond to the curvature of the generally curved cross-section of the magnetic slat devices 10.

It is readily apparent that the aforedescribed the magnetic slat devices 10, 10', 10'', 10''', 10'''' and the kit containing the same offer numerous advantages. First, the magnetic slat devices 10, 10', 10'', 10''', 10'''' provide a streamlined solution, and are each capable of being flexibly used in various applications. Secondly, the magnetic slat devices 10, 10', 10'', 10''', 10'''' can be readily combined with one another so that a myriad of different structures can be constructed therewith. Finally, the magnetic slat devices 10, 10', 10'', 10''', 10'', which can be provided as components of a slat kit, can be easily assembled with the other components of the kit to form various structures that are particularly suited to a user's specific needs.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A magnetic slat device comprising, in combination:

an elongate slat body, said elongate slat body having a generally curved cross-section with a first generally concave surface and a second generally convex surface, said elongate slat body further including a first longitudinal edge portion and a second longitudinal edge portion disposed opposite to said first longitudinal edge portion; and a plurality of magnets coupled to said elongate slat body, each of said plurality of magnets being spaced apart from one another along a length of said elongate slat body, and each of said plurality of magnets being disposed between said first and second longitudinal edge portions of said elongate slat body;

wherein each of said plurality of magnets is configured to exert a magnetic force on a magnetic object.

2. The magnetic slat device according to claim 1, wherein at least one of said plurality of magnets is coupled to said elongate slat body by means of a magnet mounting member, said magnet mounting member including a recess for receiving said magnet.

3. The magnetic slat device according to claim 2, wherein said magnet mounting member further includes a central body portion and a peripheral flange portion, said central body portion of said magnet mounting member comprising said recess for receiving said magnet.

4. The magnetic slat device according to claim 3, wherein said peripheral flange portion of said magnet mounting member comprises one or more apertures for accommodating a fastener passing therethrough.

5. The magnetic slat device according to claim 4, further comprising a respective fastener passing through each of said one or more apertures in said peripheral flange portion of said magnet mounting member, each said fastener securing said magnet to said elongate slat body.

6. The magnetic slat device according to claim 1, wherein each of said first and second longitudinal edge portions of said elongated slat body comprises bent edge portions that extend outwardly from said elongate slat body in generally opposite directions.

7. The magnetic slat device according to claim 6, wherein each of said bent edge portions comprises an edge cover formed from a resilient material.

8. The magnetic slat device according to claim 6, wherein each of said plurality of magnets comprises a first surface and a second surface disposed opposite to said first surface, said second surface of each of said plurality of magnets being disposed contiguous to said first generally concave surface of said elongate slat body.

9. The magnetic slat device according to claim 8, wherein each of said bent edge portions comprises a first surface that is connected to said first generally concave surface of said elongate slat body and a second surface that is connected to said second generally convex surface of said elongate slat body, said first surface of each of said bent edge portions being disposed opposite to said second surface of each of said bent edge portions, and wherein said first surface of each of said plurality of magnets is spaced apart from said first surface of at least one of said bent edge portions by a predetermined distance such that none of said plurality of magnets protrude beyond said first surfaces of said bent edge portions when said elongate slat body is in an undeformed state.

10. The magnetic slat device according to claim 1, wherein said elongate slat body is formed from a resilient and bendable material.

11. The magnetic slat device according to claim 1, wherein at least one of said plurality of magnets comprises a neodymium magnet.

12. The magnetic slat device according to claim 1, wherein said elongate slat body further comprises a plurality of apertures passing therethrough, each of said plurality of apertures being spaced apart from one another along a length of said elongate slat body.

13. The magnetic slat device according to claim 12, wherein said plurality of apertures comprises a plurality of pairs of said apertures, a first aperture of each of said pairs of said apertures being disposed on a first side of a respective one of said plurality of magnets, and a second aperture of each of said pairs of said apertures being disposed on a second side of a respective one of said plurality of magnets.

14. The magnetic slat device according to claim 1, wherein said elongate slat body further comprises a generally flat region in a central portion of said generally curved cross-section.

15. A magnetic slat device comprising, in combination:

an elongate slat body, said elongate slat body having a generally curved cross-section with a first generally concave surface and a second generally convex surface, said elongate slat body further including a first longitudinal edge portion, a second longitudinal edge portion disposed opposite to said first longitudinal edge portion, and a plurality of apertures being spaced apart from one another along a length of said elongate slat body; and a plurality of magnets coupled to said elongate slat body, each of said plurality of magnets being spaced apart from one another along a length of said elongate slat body, and each of said plurality of magnets being disposed between said first and second longitudinal edge portions of said elongate slat body;

wherein each of said plurality of magnets is configured to exert a magnetic force on a magnetic object.

16. A magnetic slat kit comprising, in combination:

a plurality of magnetic slat devices, each of said plurality of magnetic slat devices including:

an elongate slat body, said elongate slat body having a generally curved cross-section with a first generally concave surface and a second generally convex surface, said elongate slat body further including a first longitudinal edge portion and a second longitudinal edge portion disposed opposite to said first longitudinal edge portion; and a plurality of magnets coupled to said elongate slat body, each of said plurality of magnets being spaced apart from one another along a length of said elongate slat body, and each of said plurality of magnets being disposed between said first and second longitudinal edge portions of said elongate slat body;

wherein each of said plurality of magnetic slat devices is configured to be coupled to one another or to an external object by means of magnetic forces produced by said plurality of said magnets.

17. The magnetic slat kit according to claim 16, wherein a first device of said plurality of magnetic slat devices is configured to be coupled to a second device of said plurality of magnetic slat devices such that said first generally concave surface of said first device faces, in an opposing manner, said first generally concave surface of said second device and said plurality of magnets are encapsulated between said slat bodies of said first and second devices.

18. The magnetic slat kit according to claim 17, wherein, when said first and second devices are coupled to one another, said slat bodies of said first and second devices are each configured to resiliently deform such that at least a portion of a surface of each of said plurality of magnets of said first device lies contiguous to at least a portion of a surface of a respective one of said plurality of magnets of said second device.

19. The magnetic slat kit according to claim 16, wherein a first device of said plurality of magnetic slat devices is configured to be coupled to a second device of said plurality of magnetic slat devices such that said first generally concave surface of said first device faces, in an opposing manner, said second generally convex surface of said second device and said generally curved cross-sections of said first and second devices are disposed generally parallel to another.

20. The magnetic slat kit according to claim 16, further comprising an elongate strengthening member having a first surface and a second surface disposed opposite to said first surface, said elongate strengthening member being formed from a generally rigid material; and wherein a first device of said plurality of magnetic slat devices is configured to be coupled to a second device of said plurality of magnetic slat devices and said elongate strengthening member such that said first generally concave surface of said first device faces, in an opposing manner, said first surface of said elongate strengthening member and said first generally concave surface of said second device faces, in an opposing manner, said second surface of said elongate strengthening member, and wherein said elongate strengthening member is sandwiched between said first and second devices.

* * * * *